Figure 1:
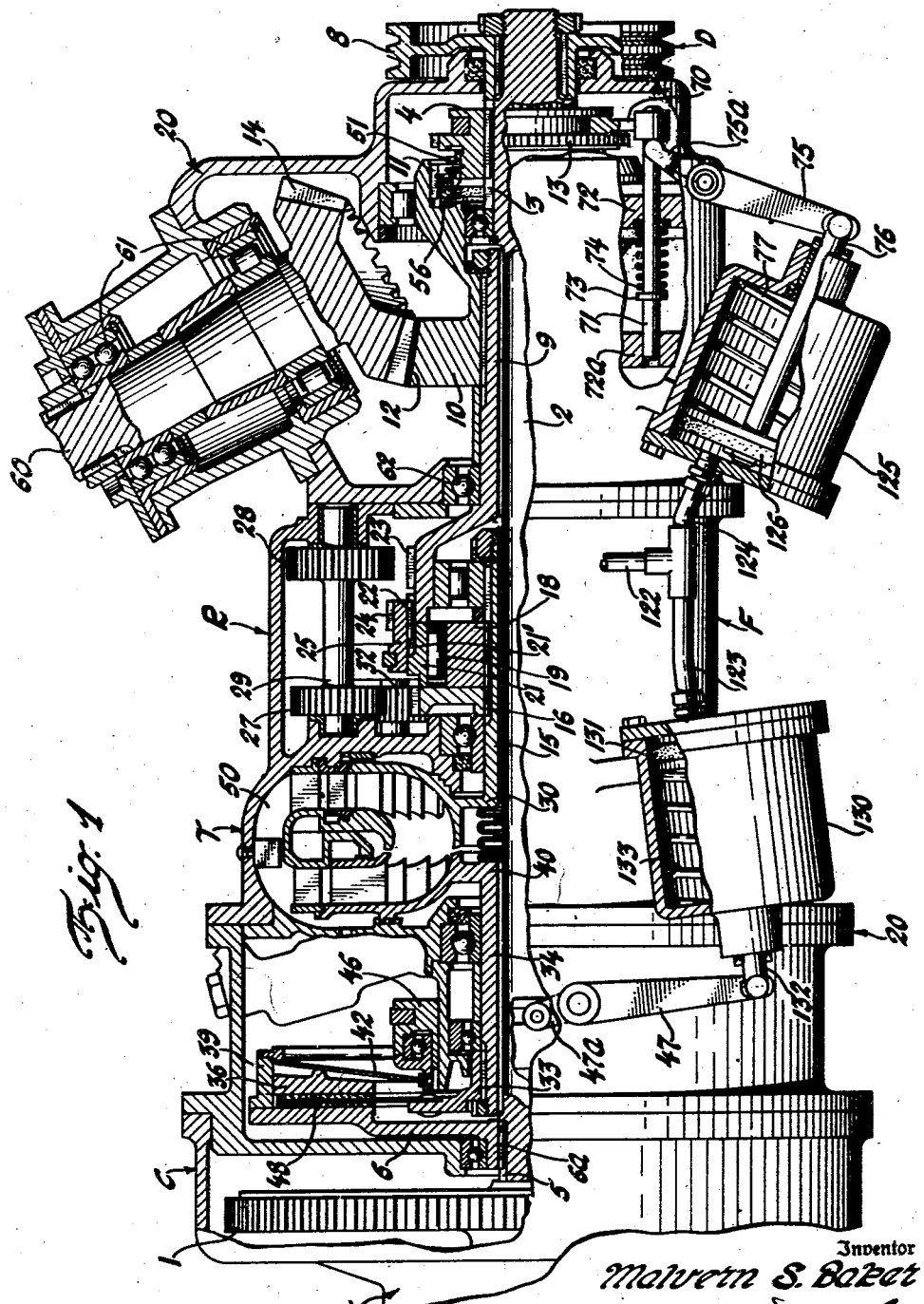

Jan. 7, 1947. M. S. BAKER 2,413,675
BALK RING SYNCHRONIZER DEVICE
Filed Sept. 16, 1938 2 Sheets-Sheet 2

Inventor
Malvern S. Baker
By
Blackmore, Spencer & Flint
Attorneys

Patented Jan. 7, 1947

2,413,675

UNITED STATES PATENT OFFICE 2,413,675

BALK RING SYNCHRONIZER DEVICE

Malvern S. Baker, Pontiac, Mich., assignor, by mesne assignments, to General Motors Corporation, Detroit, Mich., a corporation of Delaware Application September 16, 1938, Serial No. 230,288

17 Claims. (Cl. 192—53)

The present invention relates to power transmission systems, more particularly to those forms in which the drive is alternately provided through a reduction speed ratio path or a direct driving path, in changing the drive by operation of clutch devices.

It relates in particular to a form of drive in which the customary engine clutch is dispensed with, and the engine shaft is coupled directly with a vehicle load shaft through a positive jaw clutch, for direct drive therebetween. The elimination of the inertias of main clutch driven members is a necessary concomitant of my new driving system, by which shockless transition between reduction gear drive and direct drive is accomplished.

The invention relates specifically to a form of positive direct drive clutch between the engine shaft and the load shaft, having means for permitting and preventing mesh according to synchronous or asynchronous speeds of the shafts, the mesh blocking means being under continuous and constant load force during the asynchronous speed interval, and arranged to perform the mesh permitting and preventing action for overtaking speeds by either shaft.

The principal object of the invention is to provide a new and improved variable speed transmission control system employing the structures and advantages above enumerated.

The invention employs as a main object the arrangement of control which includes external loading means for the positive direct drive clutch arranged for cooperation with forces generated by the mesh preventing means, so that the constant and continuous loading action aforesaid, of the mesh blocking means creates therewith a cooperative, present response, whereby, when synchronous speed is attained between the members of the positive clutch, the external loading means proceeds to expend its force to complete the meshing action. Attention is directed to the fact that the clutch mesh blocking means herewith provides its action irrespective of the relative speeds of the shafts with which the coupling members rotate.

The advantages suggested by these objects are manifold, the simplicity attained by the reduction in the number of parts and the operations for performing the required movements over similar mechanisms heretofore available in this art, being a principal one.

The further advantages in the described arrangement of controls wherein an operator by a single movement of a single external means may alternate the drive, as aforesaid between reduction and direct, are of unique value.

While the demonstration herewith is of a transversely mounted drive embodying a fluid torque converter, contributing to an angle drive, as for a motor bus, with clutches alternating the forward drive between the torque converter and the direct clutching means, the showing is illustrative, the arrangement lending itself to other forms of drive wherein the reduction speed paths may be provided by friction, inertia, step gear and hydraulic drives of various types.

Other and further important objects and advantages of this invention will be apparent from the following specification, and sub-joined drawings, in which:

Figure 1 is an elevation, in part section, of a transmission power plant assembly mounted transversely in a motor vehicle, the final drive being through bevel gearing to an angle-drive shaft connected in the well-known manner to the vehicle differential gearing and the driving wheels. The figure shows the external control devices for operating the clutches of the invention. The showing of Figure 1 is merely by way of example, and is duplicated in my U. S. Serial Number 259,665, filed March 3, 1939.

Figure 2:
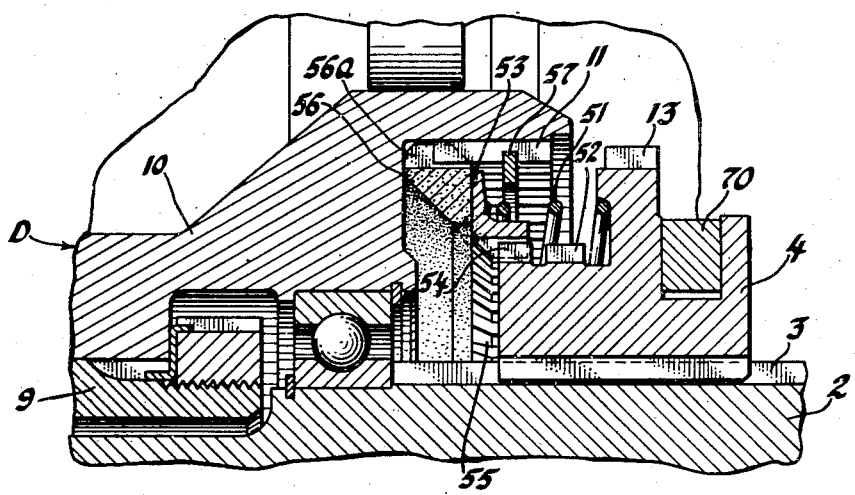

Figure 2 is an enlarged view of the direct drive clutch of Figure 1 in section, showing the elements involved in establishing the mesh rejection and mesh-permitting functions of the direct drive control device.

Figure 3:
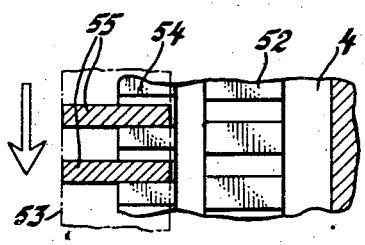
Figure 4:
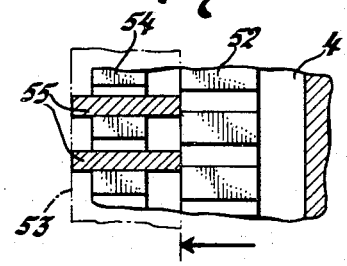
Figure 5:
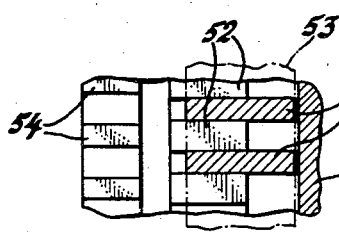
Figure 5A:
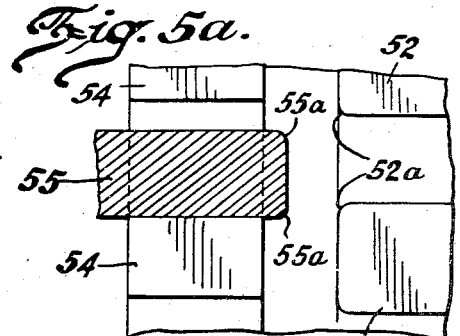

Figures 3, 4 and 5 represent developments of the direct drive clutch teeth and the relationships of the teeth of the blocking means thereto for different conditions of drive. Fig. 3 shows the relationship of the teeth at the beginning of a meshing interval; Fig. 4 shows them at the blocking point, and Fig. 5, the final, full mesh relationship after synchronism has been established. Figure 5a shows a detail of construction related to the disclosures of Figures 3 and 5 inclusive.

The general arrangement of parts, described by units in the present demonstration, to facilitate study, is as follows: E designates the vehicle engine; C the friction clutch connecting the engine to the input shaft of the fluid torque converter unit T which provides reduction speed drive; F, the freewheel clutch which transmits forward drive from the converter unit to the output shaft; R, the reverse gearing unit which enables the operator also to establish forward and reverse speed; and D the direct drive clutch which is alternately operated with clutch C for direct or for reduction drive.

The primary power plant comprises an engine E of internal combustion type, the flywheel 1 of which is shown at the left of Fig. 1; shaft 2 being affixed to rotate directly with flywheel 1 and the engine, extending through the transmission assembly to flange fitting 8 for driving the air compressor and other accessory groups.

Shaft 2 is splined at 5 to accommodate clutch hub 6a of drum 6 of clutch C, and splined at 3 to accommodate slider 4 of clutch D.

Sleeve 9 surrounding shaft 2 carries affixed bevel gear body 10 having internal ring of teeth 11, and external bevel teeth 12. Slider 4 is formed into ring of teeth 13 which mate with teeth 11, to drive member 10 at engine speed. Output jackshaft 60 mounted diagonally in bearings 61 in casing 20 is fixed to or integral with bevel gear 14 constantly meshed with bevel gear 12, transmitting the drive of sleeve 9 to the driving wheels of the vehicle, through differential gear (not shown).

Sleeve 15 likewise surrounds shaft 2, concentric with sleeve 9, and carries affixed gear 16 and roller clutch race 18 of clutch F, its leftward end terminating in turbine element 30, the output member of the turbo torque converter T.

At the left clutch drum 6 of hub 6a, rotates with the engine, and carries on overhanging flange 39 supporting a presser plate 36 operated by a disc spring 42 held at its outer periphery in flange 39, and restrained to move at its inner radial edges with collar 46 shifted by external fork 47a.

Shaft 34 surrounding shaft 2 is splined to clutch driven member 38 carrying plates 48, and is integral with, or fixed to the impeller 40 of the converter unit T. When fork 47a is shifted to the left, disc spring 42 loads plate 36, gripping plates 48, and transmitting engine torque to impeller 40 of the turbine. When fork 47a is shifted to the right as in Fig. 1, the clutch C is unloaded. Fork 47a is connected to lever 47 pivoted on casing 20, the lever 47 being pivoted to piston rod 132 of piston 131 in cylinder 130, attached to casing 20. Spring 133 normally loads piston, and lever 47 occupies the counterclockwise position of Fig. 1, with disc spring 42 thereby rendered active to load plate 36.

Fluid pressure pipes 122 and 123 may deliver pressure to piston 131, overcoming spring 133, rocking lever 47 clockwise to unload clutch C. The further utility of the fluid pressure system is discussed in detail later in this specification. The normal condition of the mechanical system of clutch C is for clutch engagement.

The torque converter unit T has three elements, an input impeller 40, an output rotor 30 and a set of fixed reaction blades 50. When torque is applied to the impeller within a designed speed range, the output rotor runs at diminished speed, but with increased torque, as is well-known in the fluid turbine art applied to variable speed drives at infinitely variable speed ratios. The present invention is not concerned with the fluid turbo torque converter per se; except insofar as the elements of the invention cooperate to yield a new result therewith.

Sleeve 9 is steadied on casing 20 by bearing 62a and has external ring of teeth 23 engaging internal teeth 22 of slider 25, which also engage teeth 21' of roller clutch member 21, the rollers 19 race 18 and member 21 constituting the one-way clutch F which overruns and permits the turbine driven member 30 to idle when shaft 2 and clutch D are delivering the torque of engine E direct to output, or shaft 60. When slider 25 is shifted from the forward drive position shown in Fig. 1 to mesh with teeth 23 of sleeve 9, the drive will be in reverse.

This is attained by the gearing R consisting of reverse idler gear 32 constantly meshed with gear 16 of sleeve 15, and with gear 27 of countershaft 29, the gear 28 meshing with teeth 24 of slider 25 when the slider teeth 22 drive teeth 23 of sleeve 9. Under these circumstances, the drive from the engine E passes through clutch C, the fluid turbo converter unit T, from 30 to gear 16, gears 32, 27, 28 and 24 to sleeve 9, which being constantly coupled by gears 12—14, drives shaft 60 in reverse, as will be understood from the form of gear transfer described. Roller clutch F idles when drive is in reverse. The general disclosure of Figure 1 is to provide a concrete application of the invention herein in an example, and no claims are herein directed to the generalized application, except insofar as they relate to complete operability in the transmission construction.

In Figure 2 the detail of the direct drive clutch D of Figure 1 is given. Friction ring 56 made of bronze or equivalent friction metal, is externally toothed at 56a to mesh with the internal teeth 11 of member 10, and presents a radial friction face engaging the face of ring 53 splined internally at 55 to teeth 54 of slider 4. Lock ring 57 inserted in a groove cut across teeth 11 prevents ring 53 from moving beyond the spacing limit shown.

The second ring of teeth 52 is located longitudinally with respect to teeth 54, and the mesh point of teeth 13—11 so that when the position of ring 53 permits free entry of teeth 55—52, the mesh of 13 with 11 will begin.

Spring 51 bears longitudinally against the flank of the radial projection of slider 4 for teeth 13, and against the adjacent portion of ring 53, applying constant load to ring 53, for pressing against bronze friction ring 56 rotating with body 10.

The force of spring 51 is calculated to apply a predetermined constant load so that ring 53 will never be free to shake into a position other than determined by the differential friction between it and ring 56, as called for by the differential rotations of shafts 2 and 9.

In the splining of ring 53, upon teeth 54 of slider 4, the description herewith shows the tooth spacing of teeth 54 in alignment with the spacing of teeth 52, but wider, so that when the radial faces of the teeth 55—54 are in abutment, because of differential rotation and because of the friction drag on ring 53, the spacing difference enables the teeth 55 of ring 53 to seat longitudinally against teeth 52 and thus balk the longitudinal movement of ring 53 and slider 4 while the differential rotation persists. When this balking action occurs, slider 4 cannot shift far enough to engage its teeth 13 with teeth 11 of body 10.

The small Figures 3, 4, and 5 show developments of the stages of mesh blocking and permitting afforded by the interaction of teeth 55 of ring 53, and teeth 52 and 54 of slider 4.

In Figure 3 slider 4 is assumed to be loaded to the left for engaging its teeth 13 with teeth 11 of body 10. Shaft 2 is assumed to have right-hand rotation when viewed from the left of Fig. 2. Ring 53 evidenced by teeth 55 of Figure 3 is advanced with respect to teeth 54.

It will be apparent to one skilled in the art, that the rotational component applied to ring 53 and its spline teeth 55 by drag from ring 56 of body 10 is derived from a faster rotation of body 10 with respect to shaft 2 and slider 4. The open arrow at the left of Fig. 3 indicates the hand of rotation, and the direction of drag.

Now if body 10 is rotating faster than shaft 2, teeth 11 will be moving at faster angular velocity than teeth 13 of slider 4, therefore it is desirable to block the entry of these teeth until synchronous speed is attained.

In Figure 4, as indicated by the black arrow, the meshing motion of slider 4 has stopped, and although its load is still being exerted, the teeth 55 of ring 53 have balked against the ends of teeth 52 of slider 4. As will be described later, the loading force applied to mesh the slider teeth 13 is never great enough to overcome the rejection force by which ring 53 blocks the longitudinal travel, until the rejection force disappears.

Having been given the face friction areas of rings 53—56, the load of spring 51 and whatever chamfer or camming angle the designer may use for the abutting teeth 55 and 52, it is a simple matter for one acquainted with such mechanisms to select the proper loading force for the total mesh movement of slider 4. The drawing of Figure 5a illustrates a useful chamfer contour for teeth 55 and 52, at 55a and 52a respectively.

Now when synchronism between shafts 2 and 9 is reached, by whatever control means, the directional force which before tended to rock ring 53 into blocking position falls off to zero, since the differential of speed has fallen off to zero. As far as the blocking mechanism is concerned, the small differential drag also falls off to zero, and may become negative, and the external force applied to slider 4 through fork 70 is then capable of pushing teeth 52 on past teeth of ring 55, which also brings teeth 13 into engagement with teeth 11, by virtue of their longitudinal spacing.

The preloading for mesh of slider 4 has a valuable characteristic which is believed worthy of emphasis. If the device were to wait or dwell until after the rotating parts had gone through zero differential, or past synchronism, an undesirable skip of mesh would occur, as teeth 13—11 tried to come to engagement. Such action is undesirable, but it does prevent shock-loading, and the operator is warned by the racing of the engine, and simply reduces the throttle to resynchronize the engine.

This point is of importance when it is remembered that in certain forms of transmission assemblies, such as utilized in the Figure 1 illustration, there is no friction clutch in the path of torque between the engine and the load shaft 60, when clutch D is engaged, so that no absorption of torque shock can occur, as in vehicles having main clutches between engine and driving mechanism. The combination of the balking action of ring 53 with its constant preload force, and the predetermined loading force for the slider mesh movement is believed novel in this art, and of utility in drives wherein the customary main clutch is eliminated, as described herewith, in the Figure 1 example.

The external loading mechanism for slider 4 consists of fork 70 attached to rod 71 as shown at the right in Fig. 1, the rod being mounted in extensions 72 and 72a of casing 20 to slide freely. The eye end of fork 70 where it is attached to rod 71 affords bearing for the one-way motion of cam arm 75a, of lever 75 pivoted in casing 20. Loading spring 74 seats against stop ring 73 of rod 71 and against portion 72 of casing 20, exerting a predetermined force tending to shift rod 71 to the left, to apply a mesh-engaging force to slider 4.

The demeshing force for slider 4 is only supplied by rotation of lever 75 about its pivot, the cam arm 75a overcoming spring 74 which otherwise may hold slider 4 in meshed position. In order to arrange the controls for ease of operation, it is desirable to superimpose a further control biasing mechanism upon the slider device so that the normal condition of clutch D is "disengaged." This is accomplished by spring 77 recessed in cylinder 125 attached to the casing 20. Piston 126 slides in cylinder 125, its rod 76 being pivoted to lever 75. Fluid pressure may be applied through pipe 122 and pipe 124 to piston 126, overcoming spring 77, allowing spring 74 to load the slider 4 for direct engine-to-loadshaft engagement, whereupon the mesh prevention action described above, and the synchronous engagement action takes place. When the fluid pressure is removed, the spring 77 shifts the slider 4 to demeshed position, clutch D being then disengaged.

The operator of the vehicle need only manipulate a valve controlling the fluid pressure to pipe 122, admitting fluid when direct drive is desired, and releasing it when direct drive is to be uncoupled.

Pipe 122 also feeds cylinder 130 attached to casing 20, the piston 131 shifting to the left against the action of spring 133 to rock lever 47 for disengaging clutch C, so that the torque converter unit may idle, when the direct drive clutch D is loaded for engagement. It will be seen that an advantage is derived from the common control by the presence or absence of fluid pressure in pipe 122, for both clutches C and D. When the fluid pressure is removed, spring 133 of cylinder 130 shifts piston 131 to the rightward end of its stroke, swinging lever 47 counterclockwise, and shifting collar 46 to load clutch C for engagement. The releasing action of clutch D, is assisted by the operator diminishing the throttle setting of the engine speed control which reduces the torque carried on the flat sides of teeth 13—11 of clutch D. As soon as the value of torque on these teeth falls below a given minimum, spring 77 through the linkage 75—75a—70, rocks lever 75 clockwise, the cam arm 75a applying a mechanical advantage, multiplying the effort of spring 77 upon slider fork 70, which thrusts slider 4 to the right, releasing jaw teeth 13 from teeth 11 of body 10. This action takes place very quickly.

In applying the fluid pressure to cylinders 125—130 to move pistons 131—126, for establishing direct drive, no particular technique in sequential motion of the levers 47—75 is needed. If the operator is running with full throttle when the control valve for pipe 122 is opened, the relative speed interval between shafts 2 and 9 will be very small so that a slight diminishing of the operator's throttle pedal setting will suffice to bring down shaft 2 to a speed equal to that of shaft 9 when synchronous speed engagement of clutch D will occur. An inexperienced driver soon learns to move the engine accelerator pedal so as to facilitate, or speed up the shift interval, just as drivers of cars equipped with standard transmissions do today.

This form of control relieves the driver of the responsibility for shifting gears to a number of positions, since the master control for pipe 122 or its equivalent need only be a single member.

The operator may shift from drive through clutch C to drive through clutch D at any time, and vice versa.

A single valve control such as described in S. N. 189,596, filed Feb. 9, 1938, may be utilized to control the fluid pressure in pipe 122.

The complete operating cycle described above is to clearly outline the utility of the invention in every detail. While fluid pressure is described for operating the controls, it seems obvious that a purely mechanical force applied to levers 75 or 47 may be used within the purview of the invention. Instead of fluid pressure, mechanical connections of common sort may be used to shift rod 76 against spring 77, and likewise for rod 132 and spring 133. No specific claims to the fluid pressure system are drawn herewith, for the reasons cited above.

In the overall operation, the operator, while slider 25 is in the forward driving position of Fig. 1, may select converter or direct drive at will by manipulating whatever control is used to alternate drive through clutch C or clutch D, without care as to the possibility of clash of clutch D, because of the unique mechanism of the present invention. It should be borne in mind that the mesh blocking action of ring 53 and teeth 55 with teeth 52 will take place whether or not shaft 9 or shaft 2 is the faster at the time of release of clutch C and the loading of clutch D for engagement, since if ring 53 is rocked in the reverse direction to the arrow of Fig. 3, the upper portions of teeth 55—52 will block instead of the lower ones described in the foregoing demonstration. The subsequent vanishing of rejection force at synchronism will occur, as described previously, the only difference being the approach to centering in the tooth spaces of teeth 54 by the teeth 55 from the opposite hand of rotation, the spring 51 continuing to apply its constant preload force.

The shifter control for the motion of slider 25 may be of common construction, as shown in S. N. 189,596, filed Feb. 9, 1938, operated from a distance by ordinary rodding and linkages from the vehicle driver's station.

The invention described herewith is believed to constitute a novel contribution to the art of vehicle drive controls whereby engine and load connected shafts may be directly coupled by a self-synchronizing jaw clutch without shock, and wherein the positive clutch mechanism is continuously and constantly preloaded for establishing a synchronous rejection of mesh, while being externally loaded by a carefully predetermined loading means incapable of overcoming the mesh rejection force until synchronism. It is believed of useful novelty to bias the clutch control mechanism as herewith demonstrated; and to establish the biasing action free from uncontrolled variable forces which may be induced by variable differential speed.

While I have pointed out in the above specifications certain novel features of my invention, it will be understood that various omissions, substitutions and changes in the form and details of my device illustrated in the annexed drawings, and in the operation may be made by those skilled in the art without departing from the spirit of the invention.

Having thus described my invention, I claim:

1. In a motor vehicle transmission, in combination, a shaft provided with a movable positive jaw clutch member, a second shaft provided with a mating jaw clutch, said movable jaw clutch member constituting a slider equipped with two rings of teeth, a friction element splined to one of said rings of teeth, a second friction element rotating with said second shaft and constantly engageable with said first named friction element, means constantly active to load said first friction element against said second named element, controllable loading means for said slider adapted to exert a longitudinal force thereupon for engagement of said members, and means whereby said first named element is caused to abut said second ring of teeth and block longitudinal force applied by said controllable loading means whenever said shafts rotate at a synchronous speed.

2. In power controls for motor vehicles, an engine, a power shaft connected directly to said engine, a load shaft, coupling means therebetween constituting inner and outer jaw clutch members adapted to establish direct drive between the shafts when meshed, a slider splined to the first named shaft including the said inner jaw member, the said outer jaw member being affixed to rotate with said load shaft, friction means associated with said shafts operative to block asynchronous mesh and to permit synchronous mesh of said coupling means, loading means constantly active to bias said friction means for blocking whenever said shafts rotate asynchronously, and loading means for said slider arranged to deliver a predetermined engagement-biasing force when said shafts are to be coupled by said coupling means for direct drive.

3. In motor vehicle power controls, in combination an engine, a power shaft connected directly to said engine, a load shaft, positive jaw coupling means adapted to couple said shafts directly, including a movable slider element equipped with jaw teeth, biasing means for said slider adapted to apply a longitudinal force thereto for engagement of said coupling means, blocking means effective to stop the motion of said slider applied by said biasing means, and mechanism included in said blocking means responsive to the differential rotation of said shafts constantly effective to overcome the meshing tendency of said biasing means while said shafts are rotating at asynchronous speeds, likewise effective to permit said biasing means to complete engagement of said coupling means at synchronous speeds of said shafts.

4. In a motor vehicle drive mechanism, in combination, a power shaft, a load shaft, a toothed slider mounted to rotate with and slide on said power shaft, embodying an external jaw clutch and two external rings of teeth, an internal clutch jaw affixed to rotate with said load shaft and meshable with said first named jaw of said slider, a friction member splined to rotate with said internal clutch jaw, a mating friction member loosely splined to rotate with one of said rings of teeth of said slider and to abut and to pass the second of said rings of teeth by virtue of the circumferential spacing of said rings with respect to each other, and loading means active upon said members to apply a constant force between them whereby said mating friction member is caused to rotate on the first named ring of teeth, and to abut the second named ring of teeth when said shafts rotate at non-synchronous speeds, thereby blocking mesh of said clutch jaws rotating with said shafts.

5. In motor vehicle transmission controls, in combination, a power shaft, a load shaft, a positive jaw clutch adapted to couple said shafts for direct drive, a slider on one of said shafts movable to engage and disengage said clutch, synchronism mesh permitting means affording a positive check against the motion of said slider toward engagement of said clutch when said shafts are rotating non-synchronously, including a rockable member constantly loaded for friction engagement between elements rotatable relatively with said shafts, and external biasing mechanism effective to load the said slider for engagement with a predetermined force incapable of overcoming the action of said means when said shafts are rotating non-synchronously.

6. In power transmission devices, a power shaft, a load shaft, positive jaw clutch members coupling said shafts one member being movable axially to engage the other, a device arranged to rotate with one of the members and to receive a differential rocking force by continuous friction contact with the other of said members, constantly active loading means adapted to apply a predetermined constant force effective to create said continuous friction contact, means operative to vary the value of said force when said movable member is moved toward engagement with the said other member, and blocking means coacting with said device effective to prevent axial motion of said movable member when said device is differentially rocked by said friction contact, and adapted to permit such axial motion when said device is not rocked by said friction contact.

7. In power transmissions, a power shaft, a load shaft, a jaw clutch rotating with one of said shafts including a friction element, a slider jaw clutch on the other of said shafts axially movable into engagement with said first named jaw clutch, a ring of teeth integral with said slider, a blocking member having a friction element adapted for continuous contact with the friction element aforementioned, and mounted to rotate with said slider through an internal ring of teeth cut on said member to fit said ring of slider teeth with limited rocking motion, loading means constantly active on said member to press said friction elements together, and a second ring of teeth integral with said slider arranged to abut the said internal ring of teeth when said shafts are rotating at dissimilar speeds, and arranged to pass through the said internal ring of teeth when said shafts are rotating at the same speed.

8. In power control mechanisms for motor vehicles, in combination, a clutch comprising driving and driven mating jaw clutch members, one of which is axially movable to engage or disengage said jaws, operating means adapted to apply a predetermined and limited engaging axial force to the movable one of such members, control means to inhibit the action of said operating means or to permit it to act, mesh preventing means including a friction device rotating with the movable one of said members adapted to block axial travel of the said member when said members rotate relatively to one another, and adapted to permit axial travel of the said member when said members rotate at the same speed, and constantly active loading means adapted to provide a predetermined constant force for said friction device whereby said mesh preventing means is constantly responsive to a differential of speed between said members.

9. In motor car transmission devices, a shaft, a second shaft concentric therewith, two jaw clutch members for coupling said shafts each rotating fixedly with said shafts respectively, a balk-ring clutch having two friction elements rotating with said shafts respectively, one of said elements being mounted to rotate fixedly with one of said jaw members, and the other of said elements being mounted for limited rotational movement with respect to the other of said members when said shafts rotate at differential speeds, loading means effective to provide a constant axial pressure on said friction elements when said members are disengaged regardless of the relative speeds of said shafts, whereby the second of said elements may be caused to rock always to a limit position with respect to the member on which it is mounted when said shafts rotate at differential speeds, and coacting means effective to block engaging motion applied to one or the other of said members until said shafts are rotating at synchronous speeds.

10. In a motor vehicle transmission mechanism, two rotatable members adapted to engage to form a drive, means for mutually engaging said members, shift control means including a constantly loaded friction element subject to a force of constant value for resisting such engagement until said members are rotating at synchronous speed, and including a further loading device actuable by said engaging means effective such that the resistance offered by said shift control means increases to an absolute blocking force at a predetermined speed differential between said members when said engaging means is moved to cause engagement of said members.

11. In power transmission, a driving shaft, a driven shaft, a positive coupling clutch between said shafts embodying a fixed jaw member and a slider member, a friction element mounted on said slider member for axial motion and adapted to bear against a portion of said first named member, a ring of external teeth integral with said slider member, a second ring of integral external teeth of greater circumferential width than said first named ring, a ring of internal teeth integral with said friction element adapted to pass through the interstices of both said rings of external teeth of said slider member when said friction element has a zero drag component, and adapted to block longitudinal motion of said slider member when said friction element receives a drag component from said first named member, and constantly active loading means arranged to apply axial pressure to said friction element, whereby the latter is always shiftable to block longitudinal motion of said slider member toward engagement when said shafts are rotating at dissimilar speeds.

12. In control devices for motor vehicle driving mechanism, a first shaft and a second shaft, positive jaw clutching means arranged for coupling and uncoupling drive between said shafts, a balking member adapted to rotate with one of said shafts and to permit and prevent mesh of said means in accordance with synchronous and non-synchronous speeds of said shafts, biasing means continuously effective to exert a biasing force constant at axial pressure on said balking member for energizing the latter by friction contact with an element rotating with the other of said shafts, and a loading means effective when said clutching means is set for coupling said shafts while they are rotating at non-synchronous speeds, and operative to augment the pressure effect of said biasing means, likewise effective to hold said clutching means coupled during the succeeding synchronous speed interval of said shafts.

13. In a power transmission driving assembly embodying means to drive at variable speed ratios between an engine-connected power shaft and a load connected shaft, and embodying alternately operative means to couple said shafts for unitary rotation, a mechanism included in said last named means comprising a jaw clutch member affixed to one of said shafts and a mating jaw clutch member rotatable with the other of said shafts and adapted to slide thereon, a shifter for said mating jaw clutch member for engaging and disengaging it with said first named member, a mesh preventing device mounted to rotate with said mating jaw clutch member and to slide axially therewith and having a friction face arranged for frictional abutment with a frictional surface of said first-named jaw clutch member, loading means effective to apply a continuous and constant force upon said device when said shifter for said mating jaw clutch is in disengaged position, and additional loading means effective to increase the loading force acting upon said device when said shifter is moved toward engaging position of said mating jaw clutch member with said first named jaw clutch member.

14. In power transmission mechanisms, a power shaft, a load shaft, a friction balking device rotating with said power shaft and having an internal ring of teeth, a member rotating with said load shaft and having a ring of clutch teeth, a slider member splined for rotation with said power shaft and having three rings of teeth; the first of which is adapted to mesh with the ring of teeth of said first named member, the second of which is constantly meshed with the internal teeth of said device with limited lost motion, and the third of which is adapted to permit or prevent axial movement of the said slider toward engagement of said first named ring of clutch teeth of said first named member with said first named teeth of said slider member; a friction element rotating with said first named member; and loading means adapted to apply a constant force to press said device against said element for rocking the said device through said lost motion to a position to prevent said axial movement when said shafts are rotating at non-synchronous speeds, and effective to rock said device to a position to permit said axial movement when said shafts are rotating at synchronous speeds.

15. In power transmission mechanism, the combination of two shafts adapted to be coupled together for unitary rotation, a positive jaw coupling having two coupling members, one to each shaft, arranged to join said shafts and to release them from unitary rotation, control means for said coupling effective to cause shifting of one of said members for engagement and disengagement with and from the other of said members, a positive blocking device positionable to prevent engagement of said members when said shafts are rotating at asynchronous speeds, said device responding to said asynchronous speed relationship, friction elements one of which is included in said device and the other with one of said members for biasing said device into blocking position, resilient loading means constantly operative upon said elements for said biasing action, and means brought into action by the movement of said control means toward causing shifting one of said members for engagement with the other of said members effective to increase the loading effect of said resilient loading means upon said elements and thereby increase the asynchronous biasing action of said device.

16. In a synchronizing mechanism, the combination of a driving clutch element, a driven clutch element movable into and out of driving engagement with the driving clutch element, a first synchronizing element fixed to said driving clutch element, a second synchronizing element, a loose driving connection between the driven clutch element and the said second synchronizing element comprising a plurality of lugs extending radially from the said driven clutch element, a number of slots in the said second synchronizing element adapted to engage the said lugs and being of greater width than the latter to allow limited movement of the said second synchronizing element in relation to the said driven clutch element to a position for blocking movement of the driven clutch element into driving engagement with the driving clutch element, and means for maintaining a light frictional contact between the said synchronizing elements whereby the said loose driving connection maintains the said second synchronizing element in blocking position except when the clutch elements are synchronized.

17. In a clutch mechanism for synchronizing the speeds of two shafts, the combination of a pair of clutch elements relatively shiftable into and out of power transmitting engagement, a synchronizing member fixedly connected to one of said clutch elements, another synchronizing member movably associated with the other clutch element, means on said another synchronizing member movable to positions for blocking and allowing shifting of a clutch element, and projecting means embodying a surface portion of the said another synchronizing member in constant friction engagement with the outer surface portion of the said synchronizing member, resilient means urging the synchronizing members into continuous frictional engagement, both of the aforesaid means cooperating in maintaining said blocking means in blocking position when the clutch elements are not synchronized.

MALVERN S. BAKER.